(12) United States Patent
Lin et al.

(10) Patent No.: US 12,393,336 B2
(45) Date of Patent: Aug. 19, 2025

(54) DATA STORAGE METHOD, HOST SYSTEM AND DATA STORAGE SYSTEM

(71) Applicant: PHISON ELECTRONICS CORP., Miaoli (TW)

(72) Inventors: Wei Lin, Taipei (TW); Jian Ping Syu, Taichung (TW); Szu-Wei Chen, New Taipei (TW); An-Cin Li, Taipei (TW)

(73) Assignee: PHISON ELECTRONIC CORP., Miaoli (TW)

( * ) Notice: Subject to any disclaimer, the term of this patent is extended or adjusted under 35 U.S.C. 154(b) by 106 days.

(21) Appl. No.: 18/461,534

(22) Filed: Sep. 6, 2023

(65) Prior Publication Data

US 2025/0060872 A1   Feb. 20, 2025

(30) Foreign Application Priority Data

Aug. 18, 2023   (TW) .................. 112131051

(51) Int. Cl.
*G06F 3/06* (2006.01)
(52) U.S. Cl.
CPC .......... *G06F 3/0604* (2013.01); *G06F 3/0644* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 9,336,081 B2 | 5/2016 | Liang | |
| 2014/0201429 A1* | 7/2014 | Tal | G06F 12/0246 711/103 |
| 2015/0234598 A1* | 8/2015 | Fujimoto | G06F 3/0658 711/102 |
| 2015/0242310 A1* | 8/2015 | Guo | G06F 12/0246 711/103 |
| 2019/0114255 A1* | 4/2019 | Jain | G06F 3/068 |
| 2019/0163620 A1* | 5/2019 | Muthiah | G06F 9/3013 |
| 2022/0011935 A1* | 1/2022 | Pitchumani | G06F 3/0652 |
| 2022/0214810 A1* | 7/2022 | Adams | G06F 3/0689 |
| 2022/0413756 A1* | 12/2022 | . | G06F 3/061 |
| 2023/0360682 A1* | 11/2023 | Yang | G11C 7/14 |
| 2024/0319901 A1* | 9/2024 | Miller | G06F 16/215 |

* cited by examiner

*Primary Examiner* — Kaushikkumar M Patel
(74) *Attorney, Agent, or Firm* — JCIPRNET

(57) ABSTRACT

A data storage method, a host system, and a data storage system are disclosed. The method includes the following. An artificial intelligence (AI) model is executed. First data to be stored to a memory storage device is obtained. In response to the first data being generated by the AI model, second data is generated according to the first data, in which the second data includes the first data, and a data amount of the second data is greater than a data amount of the first data. A first write command is sent to the memory storage device according to the second data, so as to instruct the memory storage device to store the second data.

18 Claims, 7 Drawing Sheets

DATA STORAGE METHOD, HOST SYSTEM AND DATA STORAGE SYSTEM

CROSS-REFERENCE TO RELATED APPLICATION

This application claims the priority benefit of Taiwan application serial no. 112131051, filed on Aug. 18, 2023. The entirety of the above-mentioned patent application is hereby incorporated by reference herein and made a part of this specification.

BACKGROUND

Technical Field

The disclosure relates to a data storage technology, and particularly relates to a data storage method, a host system, and a data storage system.

Description of Related Art

Portable electronic devices such as mobile phones and laptop computers have grown rapidly in recent years, which makes the demand for storage media also increase rapidly for customers. Since the rewritable non-volatile memory module (for example, a flash memory) has the characteristics of non-volatile data, power saving, small size, and no mechanical structure, the rewritable non-volatile memory module is suitable for being built in the above-mentioned examples of various portable electronic devices.

With the advancement of technology, the use of artificial intelligence (AI) model is becoming popular, so as to assist computer systems to execute functions such as image recognition or speech recognition. Generally speaking, when the AI model is in operation, the involved data are divided into multiple data units and these data units are repeatedly accessed and updated in the rewritable non-volatile memory module. However, the data amount of the data unit used by the AI model is often inconsistent with the capacity of the physical unit in the rewritable non-volatile memory module. For example, the data amount of 1 data unit may be equal to the capacity of 2.2 physical units. Therefore, after the AI model is executed for a period of time, the garbage collection (GC) program for the rewritable non-volatile memory module is easily triggered, thereby increasing the write amplification (WAF) for the rewritable non-volatile memory module and reducing the performance of the rewritable non-volatile memory module.

SUMMARY

The disclosure provides a data storage method, a host system, and a data storage system, which can improve the operation stability of the rewritable non-volatile memory module during the period of the host system executing the artificial intelligence (AI) model.

An exemplary embodiment of the disclosure provides a data storage method, which is used on a host system and a memory storage device coupled to the host system. The memory storage device includes a rewritable non-volatile memory module. The rewritable non-volatile memory module includes multiple physical units. The data storage method includes the following. An AI model is executed. First data to be stored to the memory storage device is obtained. In response to the first data being generated by the AI model, second data is generated according to the first data, in which the second data includes the first data, and the data amount of the second data is greater than the data amount of the first data. A first write command is sent to the memory storage device according to the second data, so as to instruct the memory storage device to store the second data.

An exemplary embodiment of the disclosure provides a host system, which is coupled to the memory storage device. The memory storage device includes a rewritable non-volatile memory module. The rewritable non-volatile memory module includes multiple physical units. The host system includes a buffer memory and a processor. The processor is coupled to the buffer memory and configured to perform the following. An AI model is executed. First data to be stored to the memory storage device is obtained. In response to the first data being generated by the AI model, second data is generated according to the first data, in which the second data includes the first data, and the data amount of the second data is greater than the data amount of the first data. A first write command is sent to the memory storage device according to the second data, so as to instruct the memory storage device to store the second data.

An exemplary embodiment of the disclosure provides a memory storage system, which includes a memory storage device and a host system. The host system is coupled to the memory storage device. The memory storage device includes a rewritable non-volatile memory module. The rewritable non-volatile memory module includes multiple physical units. The host system is configured to perform the following. An AI model is executed. First data to be stored to the memory storage device is obtained. In response to the first data being generated by the AI model, second data is generated according to the first data, in which the second data includes the first data, and the data amount of the second data is greater than the data amount of the first data. A first write command is sent to the memory storage device according to the second data, so as to instruct the memory storage device to store the second data.

Based on the above, during the period of executing the AI model, the host system can obtain the first data to be stored to the memory storage device. In particular, in response to the first data being generated by the AI model, the host system can automatically generate the second data according to the first data and send the first write command to the memory storage device according to the second data, so as to instruct the memory storage device to store the second data. It should be noted that the second data may include the first data, and the data amount of the second data may be greater than the data amount of the first data. In this way, the operation stability of the rewritable non-volatile memory module in the memory storage device during the period of the host system executing the AI model can be improved.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system so that the host system can write data to the memory storage device or read data from the memory storage device.

Figure 1:
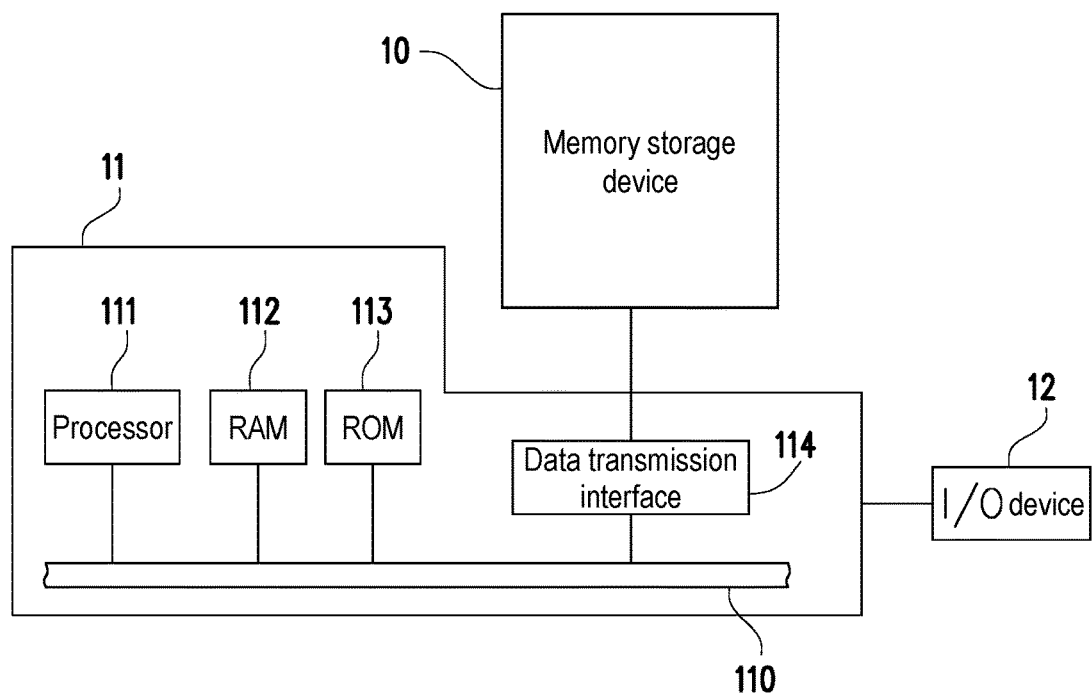
FIG. 1 is a schematic diagram of a host system, a memory storage device, and an input/output (I/O) device according to an exemplary embodiment of the disclosure.
Figure 2:
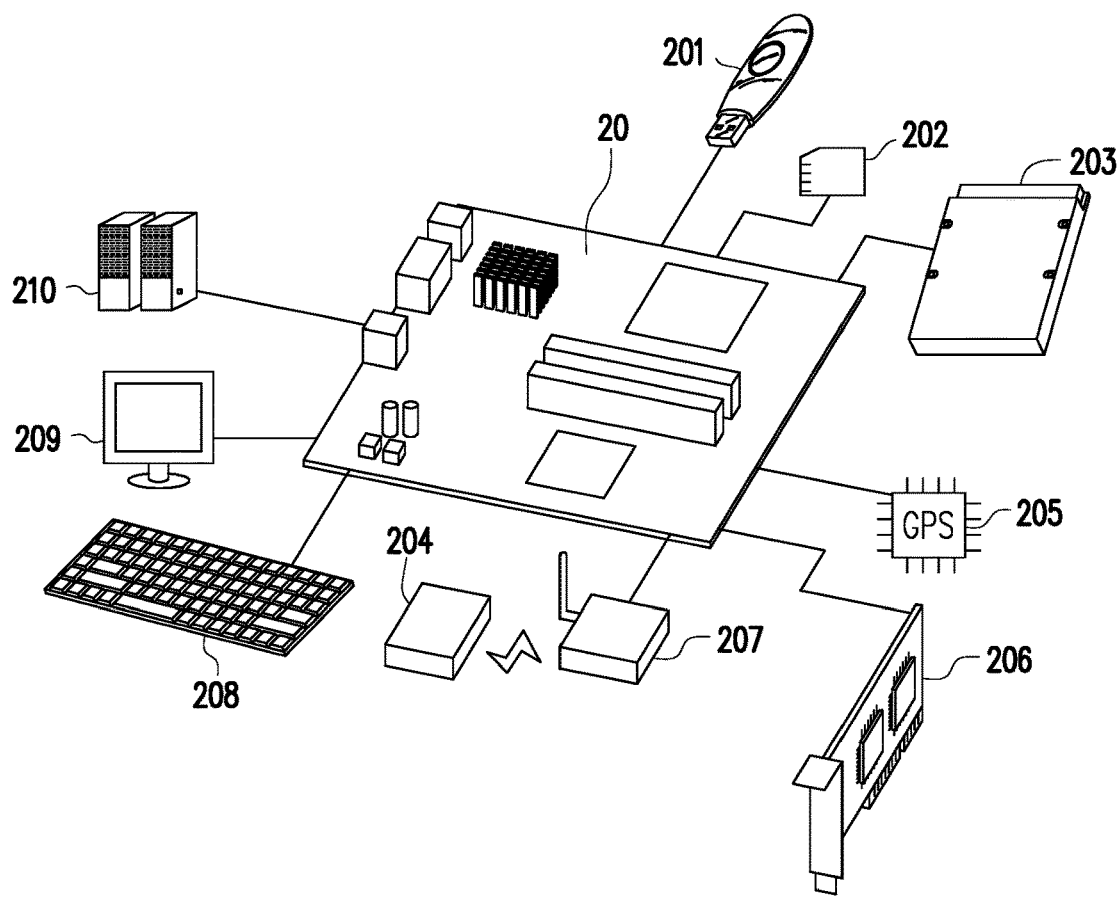
FIG. 2 is a schematic diagram of the host system, the memory storage device, and the I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of the host system, the memory storage device, and the I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to a memory storage device 10 through the data transmission interface 114. For example, the host system 11 can store data to the memory storage device 10 or read data from the memory storage device 10 through the data transmission interface 114. In addition, the host system 11 may be coupled to an I/O device 12 through the system bus 110. For example, the host system 11 can transmit output signals to the I/O device 12 or receive input signals from the I/O device 12 through the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or more. Through the data transmission interface 114, the motherboard 20 may be coupled to the memory storage device 10 through a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device, or a low consumption Bluetooth memory storage device (for example, iBeacon) and other memory storage devices based on various wireless communication technologies. In addition, the motherboard 20 may also be coupled to various I/O devices such as a Global Positioning System (GPS) module 205, a network interface card 206, a wireless transmission device 207, a keyboard 208, a screen 209, and a speaker 210 through the system bus 110. For example, in an exemplary embodiment, the motherboard 20 can access the wireless memory storage device 204 through the wireless transmission device 207.

In an exemplary embodiment, the host system 11 is a computer system. In an exemplary embodiment, the host system 11 can be any system that can substantially cooperate with the memory storage device to store data. In an exemplary embodiment, the memory storage device 10 and the host system 11 may respectively include a memory storage device 30 and a host system 31 shown in FIG. 3.

Figure 3:
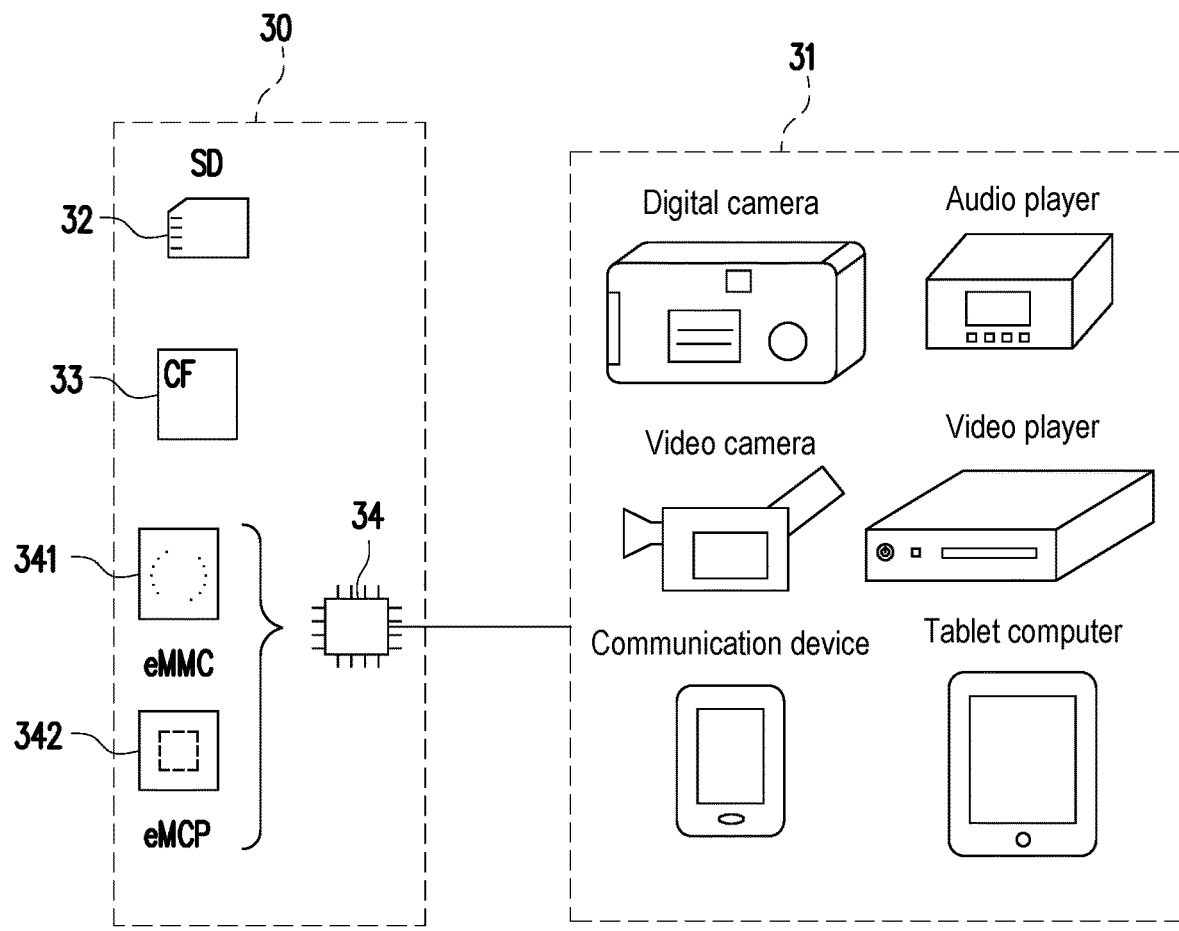
FIG. 3 is a schematic diagram of the host system and the memory storage device according to an exemplary embodiment of the disclosure.

FIG. 3 is a schematic diagram of the host system and the memory storage device according to an exemplary embodiment of the disclosure. Please refer to FIG. 3. The memory storage device 30 may be used together with the host system 31 to store data. For example, the host system 31 may be systems such as a digital camera, a video camera, a communication device, an audio player, a video player, or a tablet computer. For example, the memory storage device 30 may be various non-volatile memory storage devices such as a secure digital (SD) card 32, a compact flash (CF) card 33, or an embedded storage device 34 used by the host system 31. The embedded storage device 34 includes various types of embedded storage device that can couple the memory module to the substrate of the host system directly such as an embedded multi media card (eMMC) 341 and/or an embedded multi chip package (eMCP) storage device 342.

Figure 4:
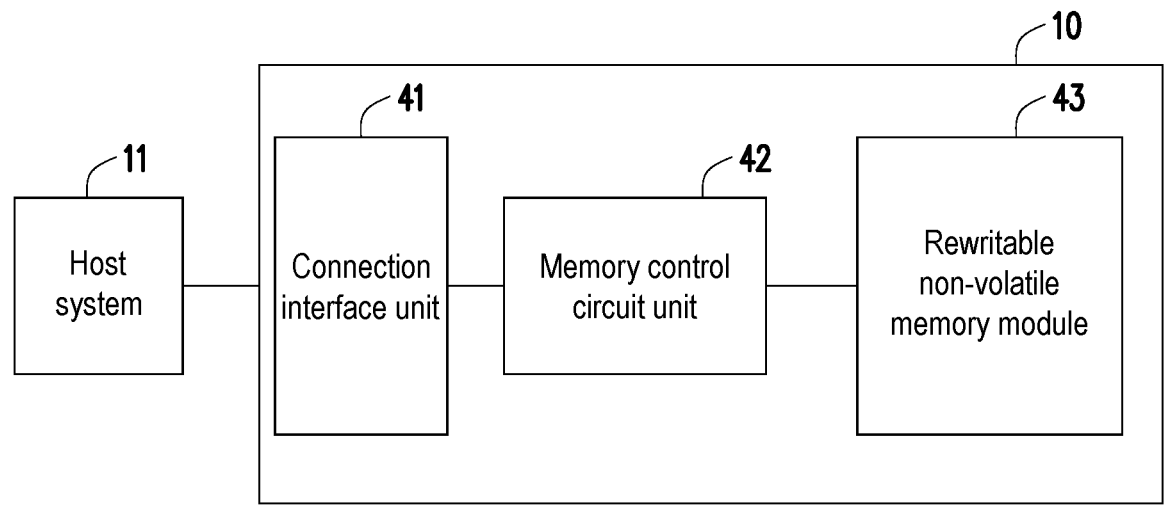
FIG. 4 is a schematic block diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 can communicate with the host system 11 through the connection interface unit 41. In an exemplary embodiment, the connection interface unit 41 is compatible with the peripheral component interconnect express (PCI Express) standard. In an exemplary embodiment, the connection interface unit 41 may also be in compliance with the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the Ultra High Speed-I (UHS-I) interface standard, the Ultra High Speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in the form of hardware or firmware and perform operations such as writing, reading, and erasing data in the rewritable non-volatile memory module 43 according to the command of the host system 11.

The rewritable non-volatile memory module 43 is configured to store data written by the host system 11. The rewritable non-volatile memory module 43 may include a single level cell (SLC) NAND flash memory module (that is, a flash memory module that can store 1 bit in a memory cell), a multi level cell (MLC) NAND flash memory module (that is, a flash memory module that can store 2 bits in a memory cell), a triple level cell (TLC) NAND type flash memory module (that is, a flash memory module that can store 3 bits in a memory cell), a quad level cell (QLC) NAND flash memory module (that is, a flash memory module that can store 4 bits in a memory cell), other flash memory modules, or other memory modules having the same characteristics.

Each memory cell in the rewritable non-volatile memory module 43 stores one or more bits by changing a voltage (hereinafter also referred to as a threshold voltage). Specifically, there is a charge trapping layer between a control gate and a channel in each memory cell. By applying a write voltage to the control gate, the amount of electrons in the charge trapping layer can be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 43 has multiple storage states. Which storage state a memory cell belongs to can be determined by applying a read voltage, thereby obtaining one or more bits stored in the memory cell.

In an exemplary embodiment, the memory cells of the rewritable non-volatile memory module 43 may form multiple physical programming units, and these physical programming units may form multiple physical erasing units. Specifically, memory cells on the same word line may form one or more physical programming units. If each memory cell can store more than 2 bits, then the physical programming units on the same word line may at least be classified into lower physical programming units and upper physical programming units. For example, the least significant bit (LSB) of a memory cell belongs to the lower physical programming unit, and the most significant bit (MSB) of a memory cell belongs to the upper physical programming unit. Generally speaking, in the MLC NAND flash memory, the writing speed of the lower physical programming unit is higher than the writing speed of the upper physical programming unit, and/or the reliability of the lower physical programming unit is higher than the reliability of the upper physical programming unit.

In an exemplary embodiment, the physical programming unit is the minimum unit for programming. That is, the physical programming unit is the minimum unit for writing data. For example, the physical programming unit may be a physical page or a physical sector. If the physical programming units are physical pages, then these physical programming units may include a data bit area and a redundancy bit area. The data bit area includes multiple physical sectors configured to store user data, and the redundant bit area is configured to store system data (for example, management data such as an error correcting code). In an exemplary embodiment, the data bit area includes 32 physical sectors, and the size of one physical sector is 512 bytes (B). However, in other exemplary embodiments, the data bit area may also contain 8, 16, or more, or less physical sectors, and the size of each physical sector may also be larger or smaller. On the other hand, the physical erasing unit is the minimum unit for erasing. That is, each physical erasing unit contains the minimum quantity of memory cells that are erased together. For example, the physical erasing unit is a physical block.

Figure 5:
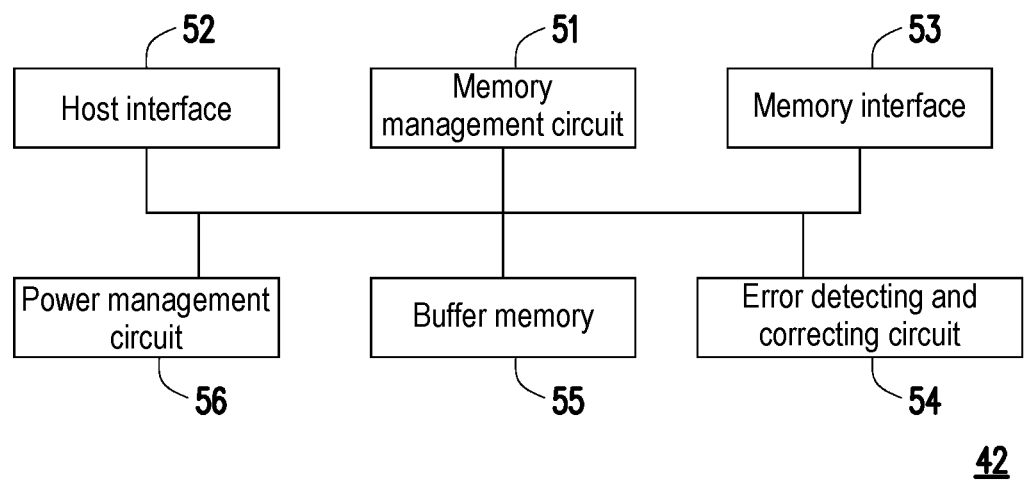
FIG. 5 is a schematic block diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands, and when the memory storage device 10 is in operation, these control commands are executed to perform the operations such as writing, reading, and erasing data. When describing the operation of the memory management circuit 51 below, it is equivalent to describing the operation of the memory control circuit unit 42.

In an exemplary embodiment, the control command of the memory management circuit 51 is implemented in the form of firmware. For example, the memory management circuit 51 has a microprocessor unit (not shown) and the ROM (not shown), and these control commands are programmed into the ROM. When the memory storage device 10 is in operation, these control commands are executed by the microprocessor unit to perform the operations such as writing, reading, and erasing data.

In an exemplary embodiment, the control command of the memory management circuit 51 may also be stored in a specific area of the rewritable non-volatile memory module 43 (for example, a system area dedicated to storing system data in the memory module) in the form of a programming code. In addition, the memory management circuit 51 has the microprocessor unit (not shown), the ROM (not shown), and the RAM (not shown). In particular, the ROM has a boot code, and when the memory control circuit unit 42 is enabled, the microprocessor unit first executes the boot code to load the control command stored in the rewritable non-volatile memory module 43 into the RAM of the memory management circuit 51. Afterward, the microprocessor unit runs these control commands to perform the operations such as writing, reading, and erasing data.

In an exemplary embodiment, the control command of the memory management circuit 51 may also be implemented in the form of hardware. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cell or memory cell group of the rewritable non-volatile memory module 43. The memory writing circuit is configured to issue a write command sequence to the rewritable non-volatile memory module 43 to write data into the rewritable non-volatile memory module 43. The memory reading circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process the data to be written into the rewritable non-volatile memory module 43 and the data read from the rewritable non-volatile memory module 43. The write command sequence, the read command sequence, and the erase command sequence may each include one or more program codes or command codes and are configured to instruct the rewritable non-volatile memory module 43 to perform the corresponding operations such as writing, reading, and erasing. In an exemplary embodiment, the memory management circuit 51 may also issue other types of command sequences to the rewritable non-volatile memory module 43 to instruct to execute the corresponding operation.

The host interface 52 is coupled to the memory management circuit 51. The memory management circuit 51 can communicate with the host system 11 through the host interface 52. The host interface 52 may be configured to receive and identify the command and data sent by the host system 11. For example, the command and data sent by the host system 11 may be sent to the memory management circuit 51 through the host interface 52. In addition, the memory management circuit 51 may send the data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and configured to access the rewritable non-volatile memory module 43. For example, the memory management circuit 51 may access the rewritable non-volatile memory module 43 through the memory interface 53. That is to say, the data to be written into the rewritable non-volatile memory module 43 is converted into a format acceptable to the rewritable non-volatile memory module 43 through the memory interface 53. Specifically, if the memory management circuit 51 is to access the rewritable non-volatile memory module 43, the memory interface 53 sends the corresponding command sequence. For example, these command sequences may include a write command sequence to instruct to write data, a read command sequence to instruct to read data, an erase command sequence to instruct to erase data, and the corresponding command sequence to instruct various memory operations (such as changing the read voltage level or executing the garbage collection (GC) operation). These command sequences are, for example, generated by the memory management circuit 51 and sent to the rewritable non-volatile memory module 43 through the memory interface 53. These command sequences may include one or more signals, or data on the bus. The signals or data may include command codes or program codes. For example, in the read command sequence, information such as the read identification code and memory address are included.

In an exemplary embodiment, the memory control circuit unit 42 also includes an error detecting and correcting circuit 54, a buffer memory 55, and a power management circuit 56.

The error detecting and correcting circuit 54 is coupled to the memory management circuit 51 and configured to perform error detecting and correcting operations to ensure the correctness of data. Specifically, when the memory management circuit 51 receives a write command from the host system 11, the error detecting and correcting circuit 54 generates an error correcting code (ECC) and/or an error detecting code (EDC) corresponding to the data of the write command, and the memory management circuit 51 writes the data corresponding to the write command and the corresponding error correcting code and/or error detecting code into the rewritable non-volatile memory module 43. Afterward, when the memory management circuit 51 reads data from the rewritable non-volatile memory module 43, the error correcting code and/or error detecting code corresponding to the data is read at the same time, and the error detecting and correcting circuit 54 performs the error detecting and correcting operation on the read data base on the error correcting code and/or error detecting code.

The buffer memory 55 is coupled to the memory management circuit 51 and configured to store data temporarily. The power management circuit 56 is coupled to the memory management circuit 51 and configured to control the power supply of the memory storage device 10.

In an exemplary embodiment, the rewritable non-volatile memory module 43 in FIG. 4 may include a flash memory module. In an exemplary embodiment, the memory control circuit unit 42 of FIG. 4 may include a flash memory controller. In an exemplary embodiment, the memory management circuit 51 in FIG. 5 may include a flash memory management circuit.

Figure 6:
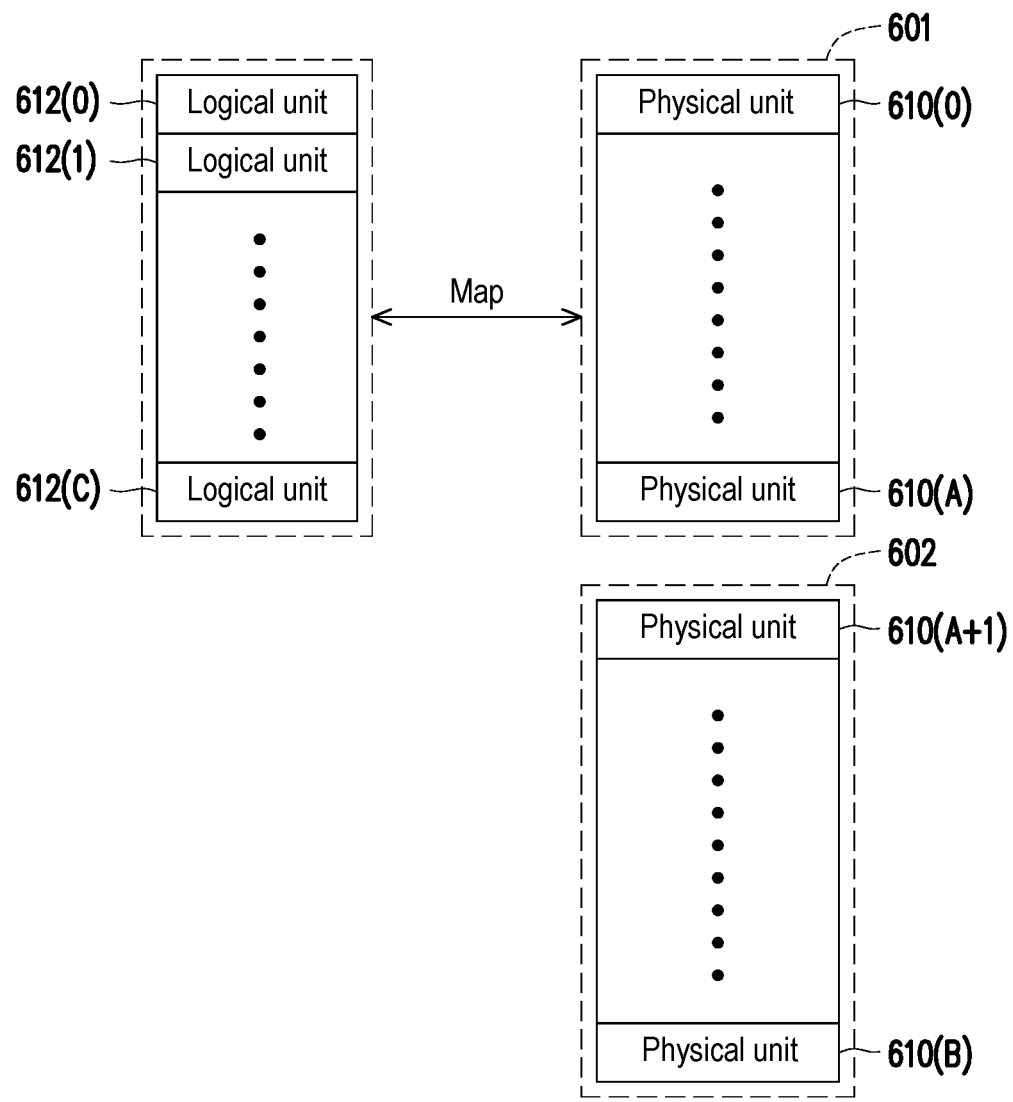
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 can logically group physical units 610(0) to 610(B) in the rewritable non-volatile memory module 43 into a storage area 601 and a spare area 602.

In an exemplary embodiment, a physical unit refers to a physical address or a physical programming unit. In an exemplary embodiment, a physical unit may also comprise multiple continuous or discontinuous physical addresses. In an exemplary embodiment, a physical unit may also refer to a virtual block (VB). A VB may include multiple physical addresses or multiple physical programming units. In an exemplary embodiment, a VB may also include one or more physical erasing units.

The physical units 610(0) to 610(A) in the storage area 601 are configured to store the user data (such as the user data from the host system 11 in FIG. 1). For example, the physical units 610(0) to 610(A) in the storage area 601 may store valid data and invalid data. The physical units 610(A+1) to 610(B) in the spare area 602 do not store data (such as the valid data). For example, if a certain physical unit does not store the valid data, then this physical unit may be associated (or added) to the spare area 602. In addition, the physical unit (or the physical unit that does not store the valid data) in the spare area 602 may be erased. When writing new data, one or more physical units may be extracted from the spare area 602 to store the new data. In an exemplary embodiment, the spare area 602 is also referred to as a free pool.

The memory management circuit 51 may configure logical units 612(0) to 612(C) to map the physical units 610(0) to 610(A) in the storage area 601. In an exemplary embodiment, each logical unit corresponds to a logical address. For example, a logical address may include one or more logical block addresses (LBA) or other logical management units. In an exemplary embodiment, a logical unit may also correspond to a logical programming unit or may comprise multiple continuous or discontinuous logical addresses.

It should be noted that, a logical unit may be mapped to one or more physical units. If a certain physical unit is currently mapped by a certain logical unit, then it means that the data currently stored by this physical unit includes valid data. Conversely, if a certain physical unit is not currently mapped by any logical unit, then it means that the data currently stored by this physical unit is invalid data.

The memory management circuit 51 may record management data (also referred to as logical-to-physical mapping information) describing the mapping relationship between the logical units and the physical units in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

In an exemplary embodiment, the host system 11 may execute one or more artificial intelligence (AI) models. For example, the AI model may be executed by the processor 111 of the host system 11. For example, the processor 111 may include a central processing unit (CPU), a graphics processing unit (GPU), or other programmable general-purpose or special-purpose microprocessors, digital signal processors (DSP), a programmable controller, an application specific integrated circuit (ASIC), a programmable logic device (PLD), or other similar devices or a combination of these devices. It should be noted that, in the following exemplary embodiments, the operation performed by the host system 11 may be regarded as being performed by the processor 111 alone or by the processor 111 in cooperation with other electronic circuits in the host system 11.

In an exemplary embodiment, the AI model may include a machine learning model and/or a deep learning model. The AI model may adopt neural network architectures such as the Deep Neural Network (DNN), the Recurrent Neural Networks (RNN), and/or the Convolutional Neural Networks (CNN) or the Artificial Neural Network (ANN). The host system 11 can execute various automation functions such as image recognition, speech recognition, or natural language processing (NLP) through the AI model, and the automation functions supported by the AI model are not limited thereto.

In an exemplary embodiment, the host system 11 may obtain data to be stored in the memory storage device 10 (also referred to as first data). The first data may include any data in the host system 11 waiting to be stored in the memory storage device 10 (such as the rewritable non-volatile memory module 43). For example, the first data may be temporarily stored in the buffer memory of the host system 11. For example, the buffer memory may include the RAM 112 in the host system 11. Alternatively, the first data may include data in any processing node or transmission node in the host system 11. In an exemplary embodiment, the host system 11 may determine whether the first data is generated by the AI model.

In an exemplary embodiment, the host system 11 may determine whether the first data includes data output by the AI model. If the first data includes the data output by the AI model, then the host system 11 may determine that the first data is generated by the AI model. However, if the first data does not include the data output by the AI model, then the host system 11 may determine that the first data is not generated by the AI model.

In an exemplary embodiment, in response to the first data being generated by the AI model, the host system 11 may generate another data (also referred to as second data) according to the first data. It should be noted that, the second data may include the first data, and the data amount of the second data may be greater than the data amount of the first data. Then, the host system 11 may send a write command (also referred to as a first write command) to the memory storage device 10 according to the second data. The first write command may be configured to instruct the memory storage device 10 to store the second data. For example, according to the first write command (such as the logical unit instructed by the first write command), the memory management circuit 51 may store the second data to a specific physical unit in the rewritable non-volatile memory module 43.

In an exemplary embodiment, in response to the first data not being generated by the AI model, the host system 11 may send a write command (also referred to as a second write command) to the memory storage device 10 according to the first data. The second write command may be configured to instruct the memory storage device 10 to store the first data. For example, according to the second write command (such as the logical unit instructed by the second write command), the memory management circuit 51 may store the first data to a specific physical unit in the rewritable non-volatile memory module 43. In other words, when the first data is not generated by the AI model, the host system 11 may skip (that is, not to execute) the operation of generating the second data according to the first data.

In an exemplary embodiment, the data amount of the second data may be equal to the total capacity of multiple physical units (also referred to as target physical units) in the rewritable non-volatile memory module 43. For example, after the first write command is transmitted to the memory storage device 10, the memory management circuit 51 may store the second data into multiple target physical units according to the first write command, and the second data can just fill up these target physical units. For example, the total quantity of the target physical units may be any integer greater than 1, depending on the data amount of the second data.

In an exemplary embodiment, after storing the second data in these target physical units, each target physical unit has no extra space or capacity to store other data (that is, the user data). In addition, each physical unit configured to store the second data may be regarded as the target physical unit. That is to say, after storing the second data in these target physical units, the second data can just fill up these target physical units.

In an exemplary embodiment, the host system 11 may generate the second data according to the first data and dummy data, so that the data amount of the second data is equal to the total capacity of the plurality of target physical units. For example, the host system 11 may add the dummy data to the first data to generate the second data. For example, the dummy data may include invalid data or any meaningless data. For example, the dummy data may comprise a series of meaningless "0" or "1" bits. After the dummy data is added, the data amount of the second data may be equal to the sum of the data amount of the first data and the data amount of the dummy data.

Figure 7:
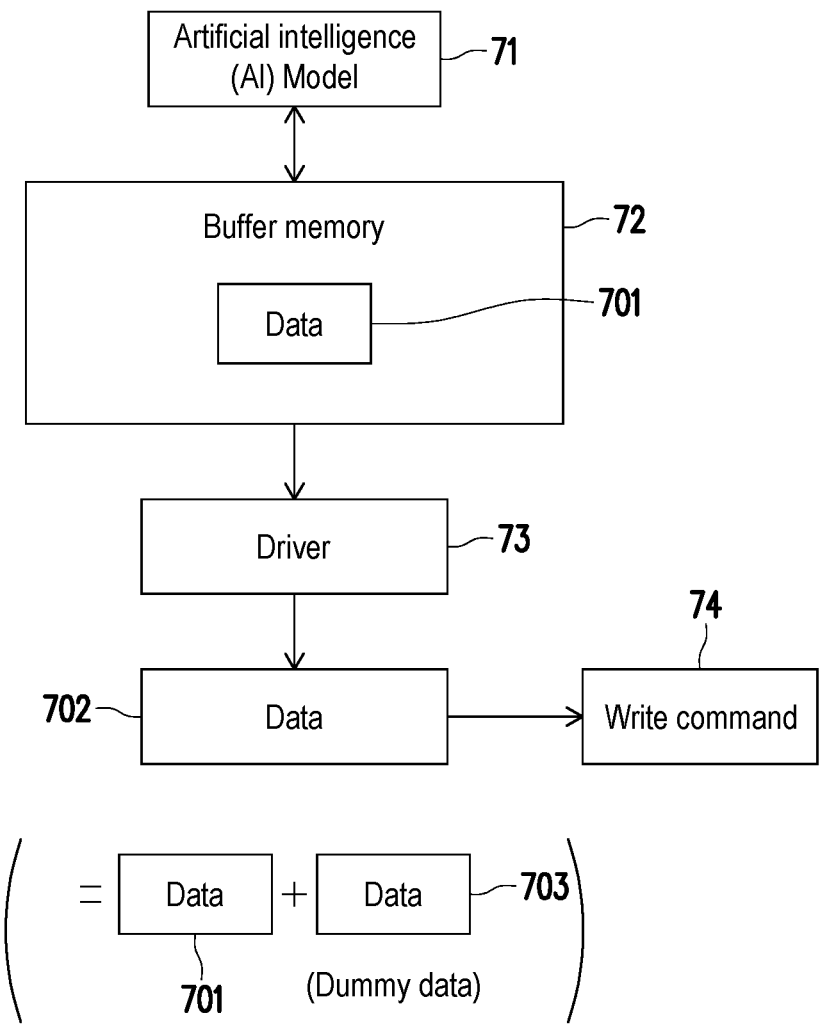
FIG. 7 is a schematic diagram of generating second data according to first data according to an exemplary embodiment of the disclosure.

FIG. 7 is a schematic diagram of generating the second data according to the first data according to an exemplary embodiment of the disclosure. Referring to FIG. 7, assuming that the host system 11 may execute an AI model 71. For example, the AI model 71 may be executed by the processor 111 in the host system 11. In addition, the host system 11 may temporarily store data 701 to be stored in the memory storage device 10 in a buffer memory 72. For example, the buffer memory 72 may include the RAM 112 in the host system 11.

In an exemplary embodiment, the host system 11 may determine whether the data 701 is generated by the AI model 71. In response to the data 701 being generated by the AI model 71, the host system 11 may generate data 702 through a driver 73. For example, the driver 73 may generate the data 702 according to the data 701. For example, the driver 73 may add the data 701 to data 703 (that is, the dummy data) to generate the data 702. Then, the host system 11 may generate a write command 74 according to the data 702. For example, the write command 74 may be configured to instruct the memory storage device 10 to store the data 702 in a specific logical unit. Then, the host system 11 may send the write command 74 to the memory storage device 10 to instruct the memory storage device 10 to store the data 702.

In an exemplary embodiment, the host system 11 may not determine whether the data 701 is generated by the AI model 71. For example, in an exemplary embodiment, the driver 73 may be connected to the AI model 71. In this way, it is not necessary to determine whether the data 701 is generated by the AI model 71, and the driver 73 can directly generate the data 702 according to the data 701 output by the AI model 71.

It should be noted that, in an exemplary embodiment, if the data 701 is not generated by the AI model 71, then the data 701 may not be processed by the driver 73. That is, if the data 701 is not generated by the AI model 71, then the host system 11 can directly generate the corresponding write command according to the data 701, and it is not necessary to generate the data 702 through the driver 73.

In an exemplary embodiment, the driver 73 can also be replaced by a specially designed file system. The driver 73 (or the file system) may be used as an interface for data access between the host system 11 (or the AI model 71) and the memory storage device 10. In an exemplary embodiment, the host system 11 (such as the driver 73) can dynamically determine the data amount of the dummy data, so that the data amount of the second data is equal to the total capacity of the multiple target physical units.

In an exemplary embodiment, the host system 11 may obtain configuration information of the physical units from the memory storage device 10. The configuration information can reflect the capacity of a single physical unit in the rewritable non-volatile memory module 43. In an exemplary embodiment, after the first data is selected, the host system 11 may determine the data amount of the dummy data according to the data amount of the first data and the configuration information, so that the data amount of the generated second data is equal to the total capacity of the target physical units. Thereby, after the second data is stored in the target physical units, the second data can just fill up the target physical units.

In an exemplary embodiment, the host system 11 may determine the data amount of the dummy data according to the following Formula (1.1).

$$\Delta D = M \times P - D(1) \quad (1.1)$$

In the Formula (1.1), D(1) represents the data amount of the first data, P represents the capacity of a single physical unit in the rewritable non-volatile memory module 43, M represents the total quantity of the target physical units, M×P represents the total capacity of the target physical units, $\Delta D$ represents the data amount of the dummy data, and M is a positive integer.

In an exemplary embodiment, according to the Formula (1.1), the host system 11 may select the minimum value of M under the condition of ensuring that $\Delta D$ is greater than zero, so as to obtain the minimum value of $\Delta D$. The host system 11 may set the minimum value of $\Delta D$ as the data amount of the dummy data configured to generate the second data. In this way, it can be ensured that while using the least (or relatively little) dummy data, the second data that can just fill up the target physical units can be generated smoothly. In addition, the Formula (1.1) may also be adjusted according to practical needs, and the disclosure is not limited thereto.

In an exemplary embodiment, the data generated by the AI model may include multiple data units. For example, the AI model may use each data unit as a basic unit to read and output data, so as to perform data operations. In particular, the data amount of a single data unit among these data units may be different from the capacity of a single physical unit in the rewritable non-volatile memory module 43. In an exemplary embodiment, the data amounts of the data units used by different types of AI models may be the same or different.

In an exemplary embodiment, the host system 11 may generate the second data according to at least one data unit (also referred to as a first data unit) among the plurality of data units and the dummy data. That is, the first data includes the first data unit. For example, the data amount of the first data may be equal to the total data amount of the first data units. In addition, the total quantity of the first data units may be n, and n may be any positive integer.

In an exemplary embodiment, the host system 11 may determine the total quantity of the first data units according to the total quantity of multiple data units generated (or used) by the AI model. After the total quantity of the first data units is determined, the host system 11 may determine the data amount of the dummy data according to the difference between the total data amount of the first data and the total capacity of the target physical units. Then, the host system 11 may add the dummy data to the first data unit to generate the second data.

Figure 8A:
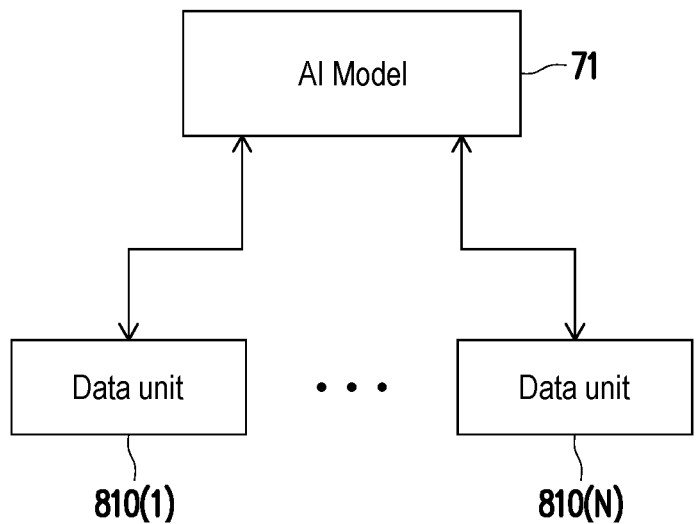
FIG. 8A is a schematic diagram of an artificial intelligence (AI) model and a data unit according to an exemplary embodiment of the disclosure.

FIG. 8A is a schematic diagram of the AI model and the data units according to an exemplary embodiment of the disclosure. Referring to FIG. 8A, assuming that the data generated (or used) by the AI model 71 includes a plurality of data units 810(1) to 810(N). The data unit 810($k$) is the basic unit to input or output data of the AI model 71, and $k$ is from 1 to N. The total quantity (that is, N) of the data units 810(1) to 810(N) may be 8, 9, 15, 16, 21, 32, or other integers greater than 1. The AI model 71 may access the data units 810(1) to 810(N) to perform data operations.

In an exemplary embodiment, during the operation period of the AI model 71, the AI model 71 may update the data in the data units 810(1) to 810(N). For example, during the operation period of the AI model 71, the AI model 71 may read the data unit 810($k$) from the rewritable non-volatile memory module 43. The data unit 810($k$) may be input to the AI model 71 to perform data operations. Then, the AI model 71 may update the data in the data unit 810($k$). The updated data unit 810($k$) may be stored in the rewritable non-volatile memory module 43.

It should be noted that, the data amount of the data unit 810($k$) may be different from the capacity of a single physical unit in the rewritable non-volatile memory module 43. For example, the data amount of the data unit 810($k$) may be greater (or smaller) than the capacity of a single physical unit in the rewritable non-volatile memory module 43.

Conventionally, during the operation period of the AI model 71, if at least one of the data units 810(1) to 810(N) is frequently stored in the rewritable non-volatile memory module 43, then the garbage collection program for the rewritable non-volatile memory module 43 is easily triggered. If the garbage collection program is frequently triggered, then the write amplification (WAF) of the rewritable non-volatile memory module 43 increases accordingly, and the performance of the rewritable non-volatile memory module is also reduced significantly.

In an exemplary embodiment, by using the dummy data to fill the first data, the second data that can just fill up the target physical units can be generated. Afterward, even if the second data is frequently stored in the rewritable non-volatile memory module 43, the used physical unit (such as the target physical unit) can be quickly released to receive new data. In this way, it is possible to improve the problem that conventionally, the write amplification of the rewritable non-volatile memory module 43 is easily increased and/or the performance of the rewritable non-volatile memory module is reduced during the operation period of the AI model 71, thereby improving the operation stability of the rewritable non-volatile memory module.

Figure 8B:
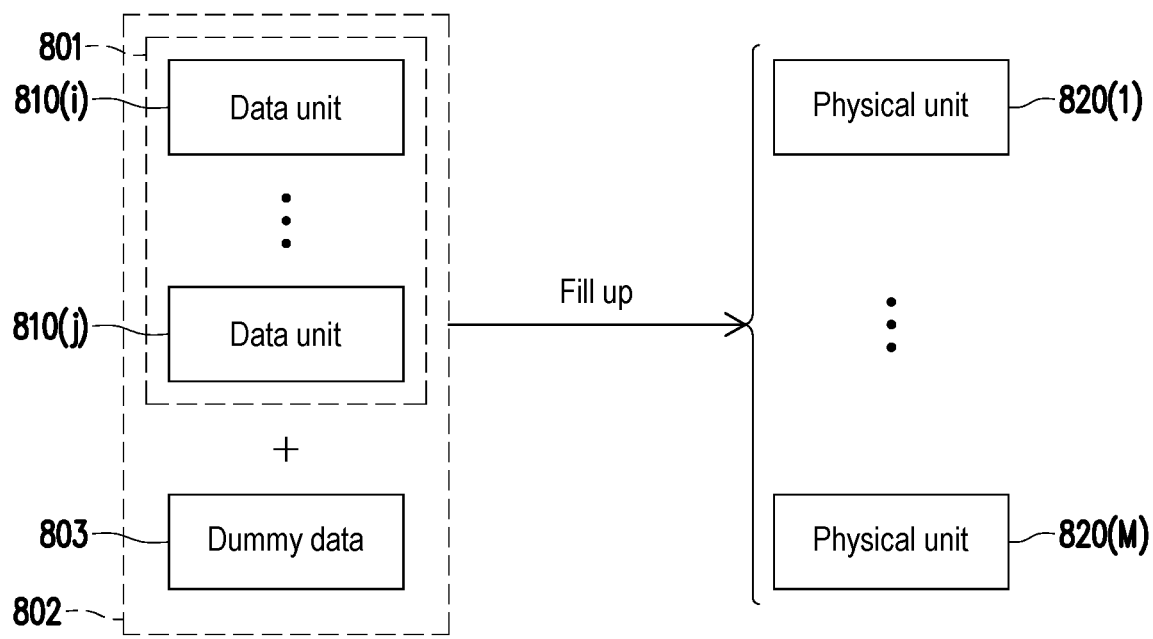
FIG. 8B is a schematic diagram of writing the second data including a first data unit and dummy data to multiple target physical units according to an exemplary embodiment of the disclosure.

FIG. 8B is a schematic diagram of writing the second data including the first data unit and the dummy data to the multiple target physical units according to an exemplary embodiment of the disclosure. Please refer to FIG. 8B. Assuming that data 801 is the first data, data 802 is the second data, and data units 810(i) to 810(j) are the first data units. For example, the total quantity of the data units 810(i) to 810(j) may be n, and n is a positive integer.

In an exemplary embodiment, the host system 11 may generate the data 802 according to the data units 810(i) to 810(j) (that is, the data 801). For example, the host system 11 may add dummy data 803 to the data units 810(i) to 810(j) to generate the data 802. The data amount of the data 802 may be equal to the total capacity of physical units 820(1) to 820(M) in the rewritable non-volatile memory module 43. For example, the physical units 820(1) to 820(M) are the target physical units, and M is a positive integer. Especially, after the data 802 is stored in the physical units 820(1) to 820(M), the data 802 can just fill up the physical units 820(1) to 820(M).

In an exemplary embodiment, the host system 11 may determine the total quantity (that is, n) of the data units 810(i) to 810(j) according to the total quantity (that is, N) of the data units 810(1) to 810(N). For example, the host system 11 may determine the total quantity (that is, n) of the data units 810(i) to 810(j) according to the minimum of all factors of the total quantity of the data units 810(1) to 810(N) (that is, N). Alternatively, the host system 11 may also bring the total quantity (that is, N) of the data units 810(1) to 810(N) into other algorithm methods to determine the total quantity of the data units 810(i) to 810(j) (that is, n), and the disclosure is not limited thereto.

In an exemplary embodiment, assuming that N is 8, then the minimum of all factors of N is 2. Therefore, the host system 11 may set the total quantity (that is, n) of the data units 810(i) to 810(j) to 2. Then, the host system 11 may add the dummy data 803 to 2 data units (such as the data units 810(1) and 810(2)) to generate the data 802.

In an exemplary embodiment, assuming that N is 9, then the minimum of all factors of N is 3. Therefore, the host system 11 may set the total quantity (that is, n) of the data units 810(i) to 810(j) to 3. Then, the host system 11 may add the dummy data 803 to 3 data units (such as the data units 810(1), 810(2), and 810(3)) to generate the data 802.

In an exemplary embodiment, the host system 11 may determine the data amount of the dummy data according to the following Formula (1.2).

$$\Delta D = M \times P - n \times U \qquad (1.2)$$

In the Formula (1.2), U represents the data amount of a single data unit used by the AI model 71, and n×U represents the total data amount of the first data units (that is, the data amount of the first data).

Similar to the Formula (1.1), according to the Formula (1.2), the host system 11 may select the minimum value of M the condition of ensuring that ΔD is greater than zero, so as to obtain the minimum value of ΔD. The host system 11 may set the minimum value of ΔD as the data amount of the dummy data configured to generate the second data. In this way, it can be ensured that while using the least (or relatively little) dummy data, the second data that can just fill up the target physical units can be generated smoothly. In addition, the Formula (1.2) may also be adjusted according to practical needs, and the disclosure is not limited thereto.

Figure 9:
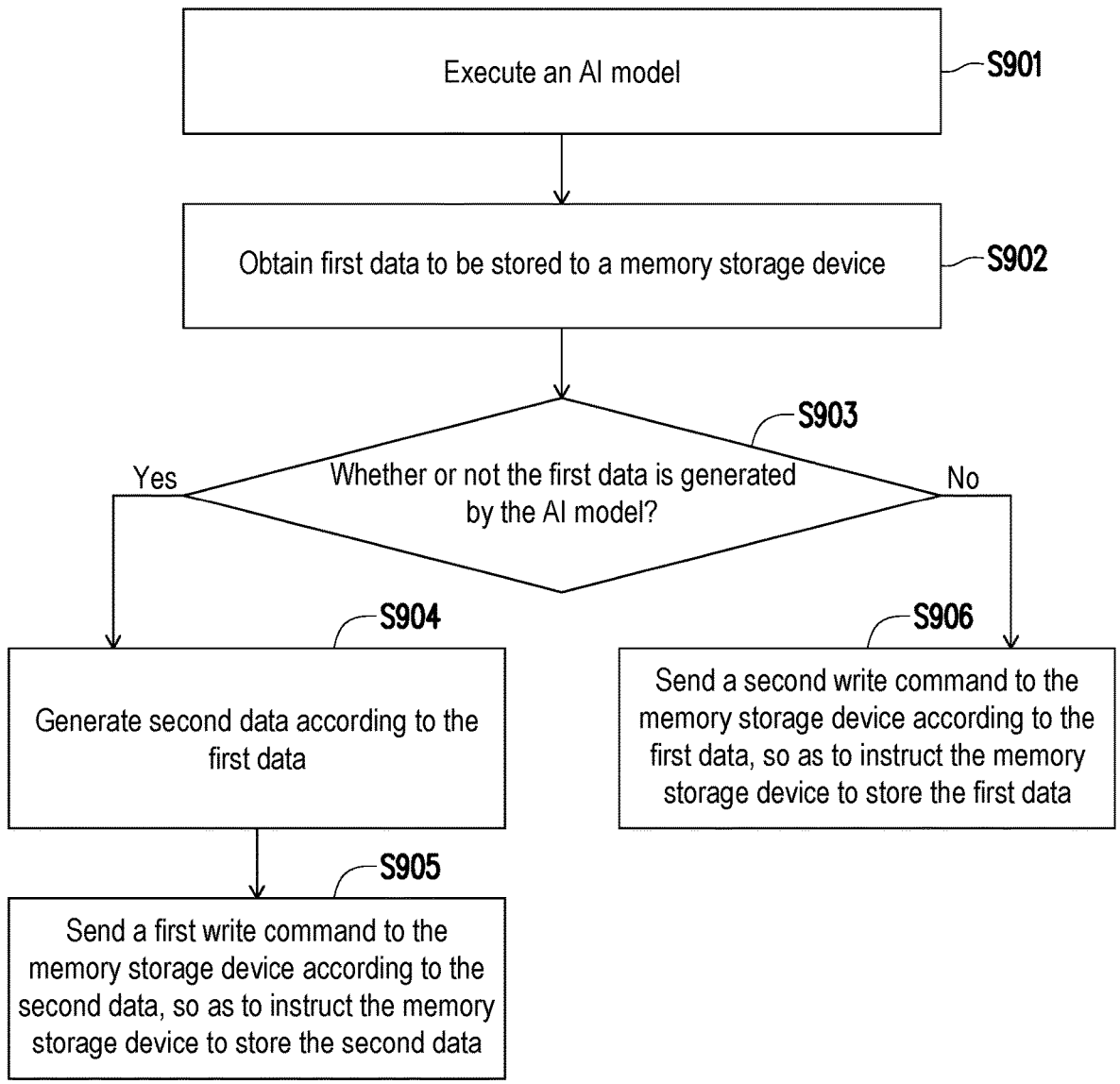
FIG. 9 is a flow chart of a data storage method according to an exemplary embodiment of the disclosure.

FIG. 9 is a flow chart of a data storage method according to an exemplary embodiment of the disclosure. Please refer to FIG. 9. In Step S901, the AI model is executed. In Step S902, the first data to be stored to the memory storage device is obtained. In Step S903, whether the first data is generated by the AI model is determined. If the first data is generated by the AI model, in Step S904, the second data is generated according to the first data. It should be noted that, the second data may include the first data, and the data amount of the second data may be greater than the data amount of the first data. In Step S905, the first write command is sent to the memory storage device according to the second data, so as to instruct the memory storage device to store the second data. However, if the first data is not generated by the AI model, in Step S906, the second write command is sent to the memory storage device according to the first data, so as to instruct the memory storage device to store the first data.

However, each Step in FIG. 9 has been described in detail above, and will not be repeated here. It should be noted that, each Step in FIG. 9 may be implemented as multiple program codes or circuits, and the disclosure is not limited thereto. In addition, the method in FIG. 9 may be used with the above exemplary embodiments, or may be used alone, and the disclosure is not limited thereto.

In summary, the data storage method, the host system, and the data storage system proposed by the disclosure can perform adjustment (for example, generate the second data according to the first data) to the data amount for the data generated by the AI model and to be stored during the operation period of the AI model on the host system. In this way, during the operation period of the AI model on the host system, even if the rewritable non-volatile memory module is accessed frequently, the write amplification and performance of the rewritable non-volatile memory module can still be controlled stably, thereby improving the operation stability of the rewritable non-volatile memory module.

Although the disclosure has been disclosed as the above embodiments, the embodiments are not used to limit the disclosure. Persons with ordinary knowledge in the technical field can make some changes and modifications without departing from the spirit and scope of the disclosure. Therefore, the protection scope of the disclosure shall be defined by the appended claims.

What is claimed is:

1. A data storage method used on a host system and a memory storage device coupled to the host system, wherein the memory storage device comprises a rewritable non-volatile memory module, the rewritable non-volatile memory module comprises a plurality of physical units, and the data storage methods comprises:
   executing an artificial intelligence model;
   obtaining first data to be stored to the memory storage device;
   determining whether the first data is generated by the artificial intelligence model;
   in response to determining that the first data is generated by the artificial intelligence model,
      generating second data according to the first data, wherein the second data comprises the first data, and a data amount of the second data is greater than a data amount of the first data; and
      sending a first write command to the memory storage device according to the second data, so as to instruct the memory storage device to store the second data; and
   in response to determining that the first data is not generated by the artificial intelligence model,
      sending a second write command to the memory storage device according to the first data, so as to instruct the memory storage device to store the first data.

2. The data storage method as claimed in claim 1, wherein the data amount of the second data is equal to a total capacity of a plurality of target physical units in the plurality of physical units.

3. The data storage method as claimed in claim 1, wherein generating the second data according to the first data comprises:
   generating the second data according to the first data and dummy data.

4. The data storage method as claimed in claim 3, wherein generating the second data according to the first data further comprises:
   obtaining configuration information of the plurality of physical units from the memory storage device, wherein the configuration information reflects a capacity of one physical unit of the plurality of physical units; and
   determining a data amount of the dummy data according to the data amount of the first data and the configuration information.

5. The data storage method as claimed in claim 1, wherein the first data comprises at least one first data unit, and a data amount of a data unit in the at least one first data unit is different from the capacity of one physical unit of the plurality of physical units.

6. The data storage method as claimed in claim 5, wherein the data generated by the artificial intelligence model comprises a plurality of data units, the plurality of data units comprise the at least one first data unit, and the data storage method further comprises:
   determining a total quantity of the at least one first data unit according to a total quantity of the plurality of data units.

7. A host system coupled to a memory storage device, wherein the memory storage device comprises a rewritable non-volatile memory module, the rewritable non-volatile memory module comprises a plurality of physical units, and the host system comprises:
   a buffer memory; and
   a processor coupled to the buffer memory and configured to:
   execute an artificial intelligence model;
   obtain first data to be stored to the memory storage device;
   determine whether the first data is generated by the artificial intelligence model;
   in response to determining that the first data is generated by the artificial intelligence model,
      generate second data according to the first data, wherein the second data comprises the first data, and a data amount of the second data is greater than a data amount of the first data; and
      send a first write command to the memory storage device according to the second data, so as to instruct the memory storage device to store the second data; and
   in response to determining that the first data is not generated by the artificial intelligence model,
      send a second write command to the memory storage device according to the first data, so as to instruct the memory storage device to store the first data.

8. The host system as claimed in claim 7, wherein the data amount of the second data is equal to a total capacity of a plurality of target physical units in the plurality of physical units.

9. The host system as claimed in claim 7, wherein generating the second data according to the first data by the processor comprises:
   generating the second data according to the first data and dummy data.

10. The host system as claimed in claim 9, wherein generating the second data according to the first data by the processor further comprises:
   obtaining configuration information of the plurality of physical units from the memory storage device, wherein the configuration information reflects a capacity of one physical unit of the plurality of physical units; and
   determining a data amount of the dummy data according to the data amount of the first data and the configuration information.

11. The host system as claimed in claim 7, wherein the first data comprises at least one first data unit, and a data amount of a data unit in the at least one first data unit is different from the capacity of one physical unit in the plurality of physical units.

12. The host system as claimed in claim 11, wherein the data generated by the artificial intelligence model comprises a plurality of data units, the plurality of data units comprise the at least one first data unit, and the processor is further configured to:
   determine a total quantity of the at least one first data unit according to a total quantity of the plurality of data units.

13. A memory storage system, comprising:
   a memory storage device; and
   a host system coupled to the memory storage device,
   wherein the memory storage device comprises a rewritable non-volatile memory module, and the rewritable non-volatile memory module comprises a plurality of physical units,
   the host system is configured to:
   execute an artificial intelligence model;
   obtain first data to be stored to the memory storage device;
   in response to determining that the first data is generated by the artificial intelligence model,
      generate second data according to the first data, wherein the second data comprises the first data, and a data amount of the second data is greater than a data amount of the first data; and send a first write command to the memory storage device according to the second data, so as to instruct the memory storage device to store the second data; and in response to determining that the first data is not generated by the artificial intelligence model, send a second write command to the memory storage device according to the first data, so as to instruct the memory storage device to store the first data.

14. The memory storage system as claimed in claim 13, wherein the data amount of the second data is equal to a total capacity of a plurality of target physical units in the plurality of physical units.

15. The memory storage system as claimed in claim 13, wherein generating the second data according to the first data by the host system comprises:

generating the second data according to the first data and dummy data.

16. The memory storage system as claimed in claim 15, wherein generating the second data according to the first data by the host system further comprises:

obtaining configuration information of the plurality of physical units from the memory storage device, wherein the configuration information reflects a capacity of one physical unit of the plurality of physical units; and determining a data amount of the dummy data according to the data amount of the first data and the configuration information.

17. The memory storage system as claimed in claim 13, wherein the first data comprises at least one first data unit, and a data amount of a data unit in the at least one first data unit is different from the capacity of one physical unit of the plurality of physical units.

18. The memory storage system as claimed in claim 17, wherein the data generated by the artificial intelligence model comprises a plurality of data units, the plurality of data units comprise the at least one first data unit, and the host system is further configured to:

determine a total quantity of the at least one first data unit according to a total quantity of the plurality of data units.

* * * * *